US012693208B2

(12) United States Patent
Cameron et al.

(10) Patent No.:  US 12,693,208 B2
(45) Date of Patent:        Jul. 28, 2026

(54) SYSTEMS AND METHODS FOR CONTINUOUS MEASUREMENT OF EROSION AND CORROSION IN OIL AND GAS FACILITIES

(71) Applicant: Chevron U.S.A. Inc., San Ramon, CA (US)

(72) Inventors: John Alasdair Cameron, Houston, TX (US); Colin Jones, Aberdeen (GB); Hariprasad Janakiram Subramani, Houston, TX (US); Lee D. Rhyne, Cypress, TX (US); Antonio Lazo, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 586 days.

(21) Appl. No.: 18/001,400

(22) PCT Filed: Jun. 11, 2021

(86) PCT No.: PCT/US2021/037074
§ 371 (c)(1),
(2) Date: Dec. 9, 2022

(87) PCT Pub. No.: WO2021/252942
PCT Pub. Date: Dec. 16, 2021

(65) Prior Publication Data
US 2023/0213434 A1       Jul. 6, 2023

Related U.S. Application Data

(60) Provisional application No. 63/037,692, filed on Jun. 11, 2020.

(51) Int. Cl.
*G01N 17/04*          (2006.01)

(52) U.S. Cl.
CPC .................................. *G01N 17/046* (2013.01)

(58) Field of Classification Search
CPC ........................... G01N 17/043; G01N 17/046
See application file for complete search history.

(56) References Cited

U.S. PATENT DOCUMENTS 5,134,879  A  *  8/1992  Wong ..................... G01N 17/00
                                                              73/863.85
2006/0037399 A1     2/2006  Brown
                            (Continued)

FOREIGN PATENT DOCUMENTS

GB            2496890  A  *  5/2013  ........... G01N 17/043
WO         2007052022  A1     5/2007

OTHER PUBLICATIONS

PCT International Search Report, mailed on Sep. 23, 2021 issued in Application No. PCT/US2021/037074, filed on Jun. 11, 21, 14 pages.

*Primary Examiner* — Nathaniel J Kolb
(74) *Attorney, Agent, or Firm* — Avery L. Cate

(57)                ABSTRACT

Disclosed are systems and methods for detecting the erosion and corrosion effects of solids during oil and/or gas production. An erosion corrosion detector (BCD) is positioned in fluid communication with a pipe in a production facility such that a sensor element of the BCD contacts at least a partial stream of produced fluid in the pipe. Changes in one or more physical measurement of the BCD and/or changes in pressure drop across the sensor element are monitored over time. The changes are interpreted to identify whether there is loss of materials (e.g., metal) in the production facility, quantify of this loss, and determine the mechanisms through which this loss is occurring. A control system can receive the change in the physical measurement and/or the pressure drop over time as input into a control strategy for (Continued)

controlling a well control valve to control a rate of production of well fluids.

16 Claims, 5 Drawing Sheets

(56) References Cited

U.S. PATENT DOCUMENTS

| | | | |
|---|---|---|---|
| 2010/0326654 A1* | 12/2010 | Hemblade | E21B 43/08 |
| | | | 166/250.01 |
| 2011/0186436 A1 | 8/2011 | Novosselov | |
| 2013/0180908 A1* | 7/2013 | Chancellor | B01D 65/02 |
| | | | 210/257.2 |
| 2015/0260633 A1 | 9/2015 | Hedtke | |
| 2016/0091411 A1 | 3/2016 | Hedtke | |
| 2016/0202229 A1 | 7/2016 | Xiong | |
| 2019/0064095 A1* | 2/2019 | Clarke | G01N 29/14 |

* cited by examiner

SYSTEMS AND METHODS FOR CONTINUOUS MEASUREMENT OF EROSION AND CORROSION IN OIL AND GAS FACILITIES

FIELD

The present disclosure relates to systems and methods for detecting erosion and/or corrosion resulting from the presence of solids such as sand and fines in production fluids in oil and gas facilities that can limit production rates of such facilities.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Oil and/or gas are typically recovered from underground reservoirs containing such fluids. The fluids are brought to the surface via a production tubing inserted into a well formed in the reservoir. The production tubing includes one or more openings or perforations which allow the fluids to enter the production tubing from the reservoir. Because the fluids are flowing from rock formations, there may be various particulates being carried in the fluid, such as rock grains, fragments, sediments, and the like. In order to prevent these particulates from being carried into the production tubing, a cylindrical sand control device is disposed over a portion of the production tubing. The sand control device, also referred to as a sand screen, acts as a screen or filter which prevents some particulates from entering the production tubing. A sand control device may include one or more screen layers of similar or different construction in order to prevent various particulates from entering the production tubing.

Conventional sand screen assemblies include a perforated base pipe, a drainage layer, a filter medium, and a protective jacket or shroud. Such screen assemblies are designed to filter out particles, such as formation sand or placed gravel/proppant, while facilitating the passage of hydrocarbon fluids into the wellbore. One drawback in the deployment of such screen assemblies is the erosion and/or corrosion of the filter medium, for example due to particle impingement contained in the fluids that pass the screen assemblies. The presence of particulate in the flow stream, coupled with the current designs and manufacturing methods of the screen assemblies, can cause erosion and/or corrosion. For instance, current designs and manufacturing methods minimize the space, or offset, between the sand screen components for a number of reasons, which can increase erosion of the filter medium. Also, current base pipe designs have a limited inflow area due to limited number of perforated holes. These holes cause a flow concentration that localizes and increases the erosion and/or corrosion of the filter medium. When the filter medium becomes eroded and/or corroded, also referred to as a screen failure, then particles are produced from the well in quantities that are highly undesirable. Production of these particles, even at the parts per million level, over time can cause excessive erosion and/or corrosion of production tubulars, downhole equipment and surface equipment, and lead to high maintenance costs and undesirable downtime of wells. With current technology, the size, hardness, shape, velocity and concentration of these particles are all highly uncertain.

It is now recognized that it would be beneficial to have an improved method for detecting and estimating erosion and corrosion due to the presence of sand and/or other solid particles in produced fluids. Based on such detection, problems can be mitigated or production rate can be adjusted (increased or decreased) accordingly. It is also desirable to be able to predict if and when the downhole sand control screen, or other production equipment, may fail and to adjust the well flowing rate to optimize well production.

SUMMARY

In general, in one aspect, the disclosure relates to a system for detecting solids in an oil and/or gas production facility. The system includes a screen positioned across a pipe in the oil and/or gas production facility such that the screen contacts at least a partial stream of fluid flowing through the pipe; and a means for measuring a change in a physical measurement of the screen over a period of time. The change in the physical measurement of the screen over the period of time can be monitored to determine whether solids are present in the fluid flowing through the pipe.

In another aspect, the disclosure relates to a system for detecting solids in an oil and/or gas production facility, which includes a screen positioned across a pipe in the oil and/or gas production facility such that the screen contacts at least a partial stream of fluid flowing through the pipe; and a means for measuring a change in pressure drop across the screen over a period of time. The change in pressure drop across the screen over the period of time can be monitored to determine whether solids are present in the fluid flowing through the pipe.

In another aspect, the disclosure can generally relate to a method for detecting solids in an oil and/or gas production facility. The method includes positioning a screen across flow in a pipe in the oil and/or gas production facility such that the screen contacts a full stream of fluid flowing through the pipe; and measuring a change in a physical measurement of the screen over a period of time; such that the change in the physical measurement of the screen over the period of time is monitored to determine whether solids are present in the fluid flowing through the pipe.

In another aspect, the disclosure can generally relate to a method for detecting solids in an oil and/or gas production facility, which includes positioning a screen across flow in a pipe in the oil and/or gas production facility such that the screen contacts a full stream of fluid flowing through the pipe; and measuring a change in pressure drop across the screen over a period of time; such that the change in pressure drop across the screen over the period of time is monitored to determine whether solids are present in the fluid flowing through the pipe.

In yet another aspect, the disclosure can generally relate to a control system control system for controlling a well control valve to control a rate of production of well fluids. The control system can receive the change in the physical measurement of the screen and/or the pressure drop across the screen over the period of time as input into a control strategy for controlling the well control valve.

BRIEF DESCRIPTION OF THE DRAWINGS

These and other objects, features and advantages of the present disclosure will become better understood with reference to the following description, appended claims and accompanying drawings, wherein:

DETAILED DESCRIPTION

As set forth above, it is now recognized that it would be beneficial to have an improved method for detecting and estimating erosion and/or corrosion due to the presence of sand and other solid particles in produced fluids. Based on the detection, problems can be mitigated or production rate can be adjusted (increased or decreased) accordingly. It is also desirable to be able to predict if and when a downhole sand control screen and/or other portions of a production system may fail and to adjust the well flowing rate to optimize well production.

In accordance with embodiments of this disclosure, a sensor element is installed in a production line, for example between a wellhead and a gathering system manifold. The sensor element is not an exact copy but in certain embodiments may mimic the design of the downhole sand control screen installed in the well. In particular, the sensor element may be constructed in a manner similar to a downhole sand control screen with changes in geometry and, in certain embodiments, changes in material construction. The sensor element may have components, such as filaments (e.g., metallic filaments), configured to erode and/or corrode in a manner that can be related to other elements of the well and/or other portions of a piping system (e.g., piping elbows). Physical changes in the sensor element (e.g., due to erosion and/or corrosion) may then be related to physical changes in the downhole sand control screen (e.g., due to erosion and/or corrosion) using one or more relationships between the sensor element and the downhole sand control screen. Thus, in certain embodiments the cumulative erosion and/or corrosion of the sensor element due to production can be related to the downhole sand control screen. As one example, high erosion of the sensor element observed at the surface may serve as an early indication of erosion occurring in the downhole sand control screen. Operational parameters of the well (e.g., well flowing rate) may be controlled or adjusted using information relating to physical changes in the downhole sand control screen.

As also noted, with current technology, the size, hardness, shape, velocity and concentration of erosive particles are all highly uncertain which makes modeling downhole screen erosion difficult. It is now recognized that the uncertainties in particle size, shape, hardness and concentrations are largely eliminated by measuring the erosion and/or corrosion directly at the surface in accordance with this disclosure.

Figure 1:
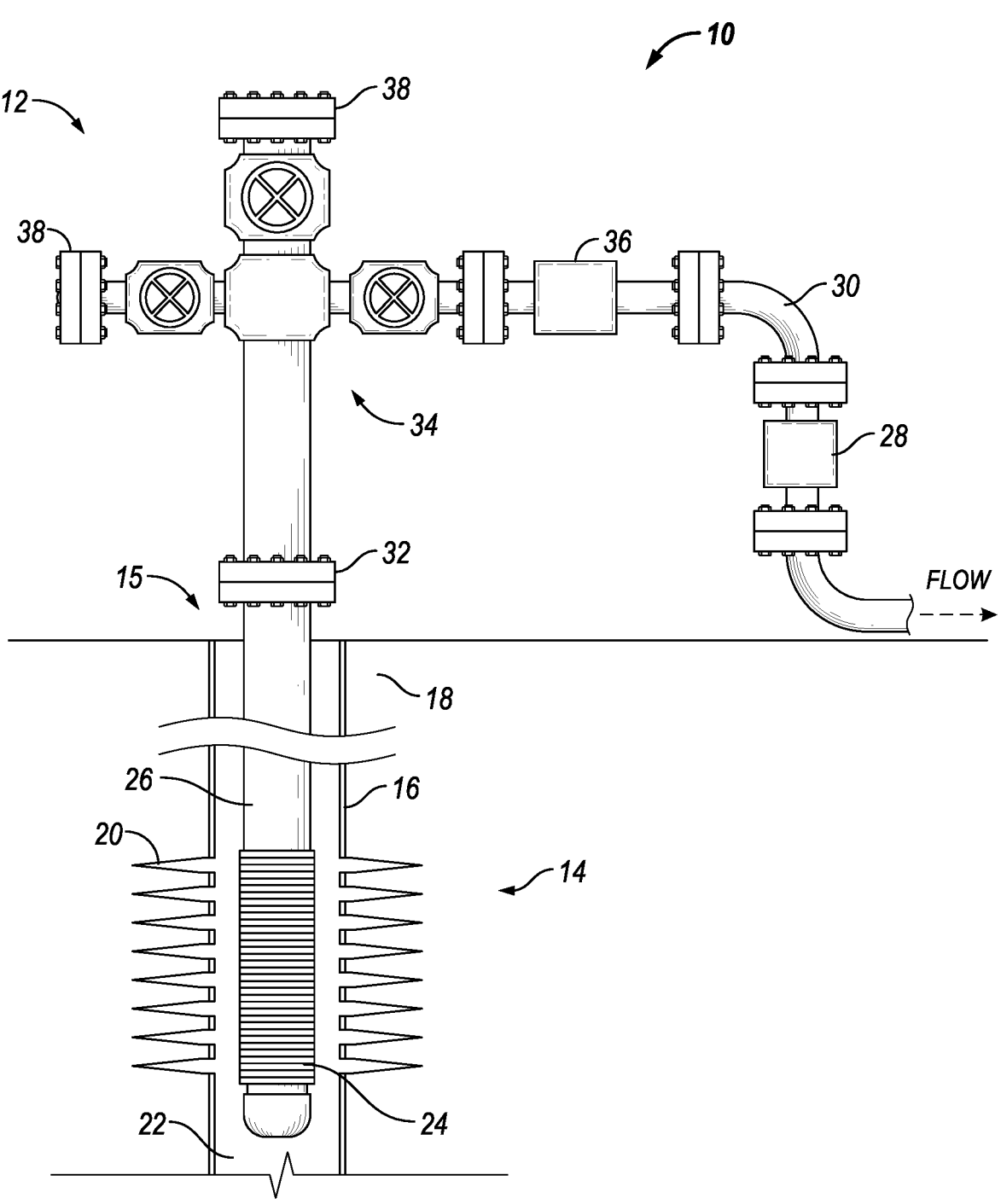
FIG. 1 is a schematic diagram of an example embodiment of a field system in which an erosion corrosion detector (ECD) is utilized for monitoring erosion and corrosion of elements of the system.

In some embodiments of this disclosure, a system and method for detecting erosion and/or corrosion due to the presence of solids (including but not limited to sand) in an oil and/or gas production facility is provided. The oil and/or gas production facility can be a subsea facility having at least one subsea well. Alternatively, the system can be a surface system having at least one surface wellhead. An example production system 10 is depicted in FIG. 1. The illustrated production system 10 includes both surface components 12 and downhole components 14 associated with a well 15 to facilitate a better understanding of the approaches described herein. The downhole components 14 include, by way of non-limiting example, a casing 16 that separates a surrounding subsurface formation 18 from other downhole components 14. Perforations 20 in the casing 16 (and in the subsurface formation 18) expose an internal annulus 22 to the subsurface formation 18, which allows for fluid production. The internal annulus 22 may be a sand screen annulus, and may be filled with proppant (e.g., sand, gravel).

A downhole sand control screen 24 is positioned within the internal annulus 22 and is fluidly connected to production tubing 26. As fluid is produced from the subsurface formation 18, the downhole sand control screen 24 filters at least some of the sand which may be contained within the produced fluids before the fluids flow into the production tubing 26 and eventually to the surface. Generally, the downhole sand control screen 24 is susceptible to erosion and corrosion from the sand, and the amount of sand produced from the subsurface formation 18 generally increases later in the life of the well. As an example, greater amounts of sand may be expected after a certain amount of rock failure through depletion and drawdown and with water breakthrough. It is now recognized that production may be accelerated early in the life of the well in a manner that is unconstrained by sand erosion and corrosion concerns, but on the proviso that sand (or the effects thereof) can be reliably detected at a relatively early stage.

To allow for such detection, certain embodiments of this disclosure include an erosion corrosion detector (ECD) 28, which may be installed for example in a production line 30 between a wellhead 32 and a gathering system manifold (not shown). In the illustrated example embodiment of FIG. 1, the ECD 28 is installed downstream of a Christmas tree 34 and a production choke 36. In other embodiments, the ECD 28 may be installed in a different location, for example via direct or indirect connection to the Christmas tree 34 at one or more separate flange locations 38.

Figure 2A:
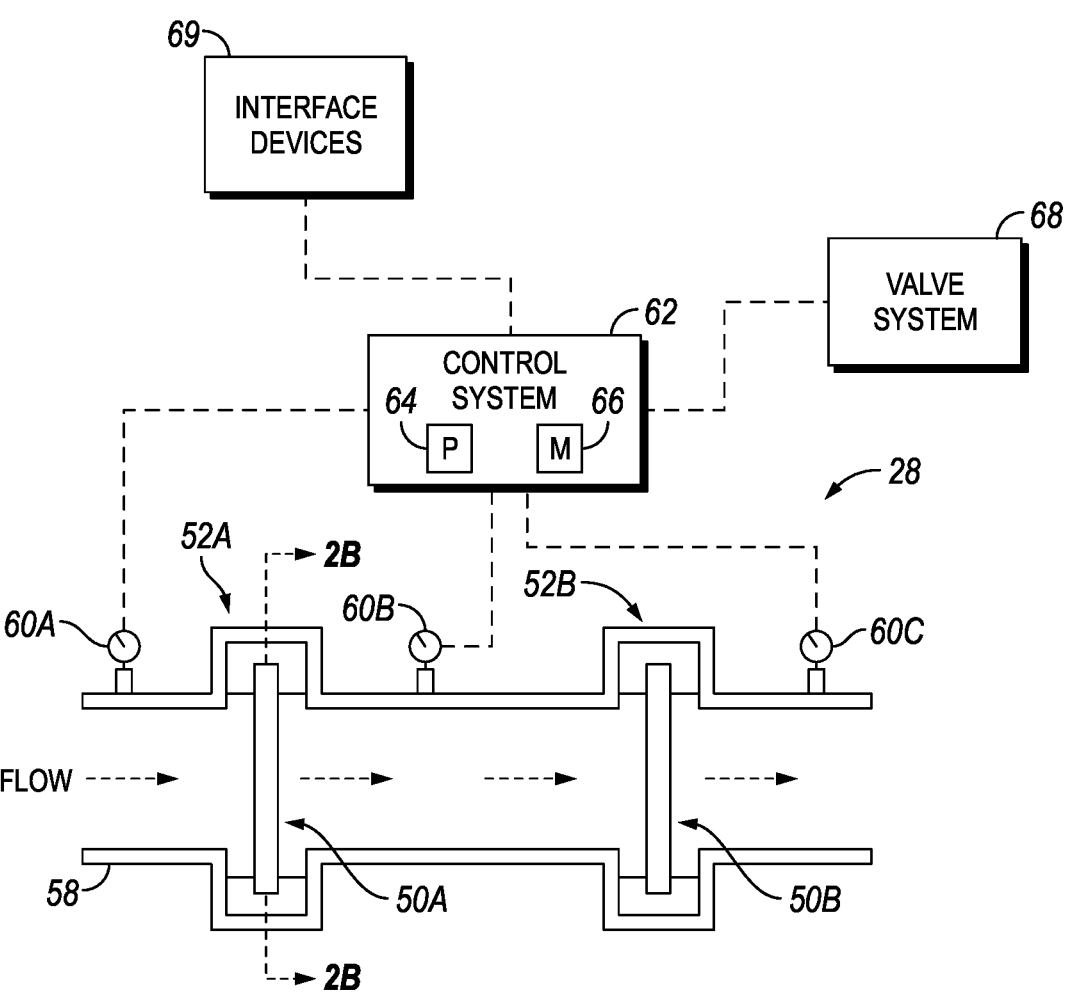
FIG. 2A is an elevation view of an embodiment of the ECD.

The configuration of the ECD 28 used in accordance with embodiments of the present disclosure may be further appreciated with reference to FIG. 2A, which is an elevation view of an embodiment of the ECD 28. The ECD 28 may be considered to constitute all or a part of a system for detecting erosion and/or corrosion in an oil and/or gas production facility. In the embodiment illustrated in FIG. 2A, the ECD 28 is configured to detect both erosion and corrosion by the inclusion of at least two sensor elements 50—illustrated as a first sensor element 50A and a second sensor element 50B.

The first sensor element 50A and the second sensor element 50B are illustrated as being in series, though in other embodiments they may be arranged in parallel such that the sensor elements 50 receive respective flows (streams) that are the same. The manner in which erosion and corrosion may be detected is described in further detail below.

In the illustrated embodiment, the sensor elements 50 are positioned within respective mounting assemblies 52 (including first mounting assembly 52A and second mounting assembly 52B). The mounting assemblies 52 generally include features that allow for ready connection to existing flow lines or similar features of the system 10, as well as various sensor devices described below. In other embodiments, the sensor elements 50 may be positioned within the same mounting assembly 52 to facilitate withdrawal and measurements of the sensor elements 50.

In one embodiment, the sensor elements 50 are not exact copies of the downhole sand control screen 24, but each mimic its design in a way that allows measurements of the respective sensor element 50 taken at the surface to be related to the current state of the downhole sand control screen 24 and, accordingly, to properties of fluid being produced by the well 15.

The use of two sensor elements 50 allows the ECD 28 to detect whether material losses of the sensor elements 50 (and thus, elements of the system 10) are due to erosion, corrosion, or both. In particular, in the illustrated embodiment, the first sensor element 50A and the second sensor element 50B have the same geometric construction but are formed from materials having differing degrees of susceptibility to corrosion (different levels of corrosion resistance). As one example, one of the sensor elements 50 (e.g., the first sensor element 50A) may be constructed from stainless steel, while the other sensor element 50 (e.g., the second sensor element 50B) may be constructed from carbon steel. In this situation, there may be three scenarios: (1) equivalent material loss for both the first sensor element 50A and the second sensor element 50B; (2) material loss for both the first sensor element 50A and the second sensor element 50B, but at different levels; and (3) no material loss for the corrosion-resistant sensor element (e.g., the stainless steel sensor element) and material loss for the corrosion-susceptible sensor element (e.g., the carbon steel sensor element).

In scenario (1), the equivalent material loss indicates that erosion due to solids in the produced fluids is the predominant mode of material loss for the sensor elements 50, thereby indicating erosion of certain components of the system 10. In scenario (2), the non-zero, different levels of material loss indicates that both erosion and corrosion have resulted in material loss for the sensor elements 50 and is present within the system 10. In scenario (3), the lack of material loss for the corrosion-resistant sensor element indicates that no substantial erosion is present, but that corrosion has caused material loss within the system 10.

Figure 2B:
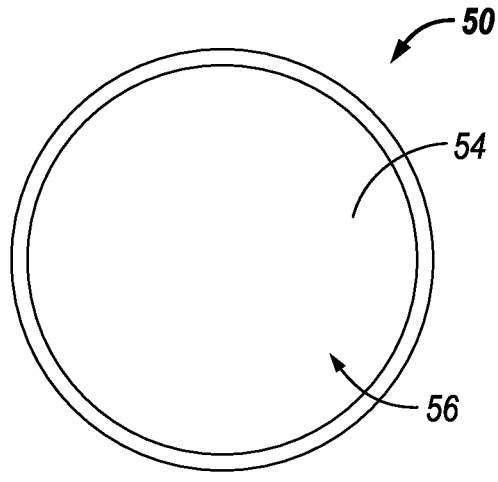
FIG. 2B is a partial cross-sectional view taken along cross-section A-A of FIG. 2A and depicting an embodiment of a sensor element of the ECD.

Each of the sensor elements 50, as illustrated, includes at least one filament layer 54 but may include more than one in certain configurations. As illustrated in the detail view of FIG. 2B taken along section A-A from FIG. 2A, each of the sensor elements 50 includes at least one mesh or filament layer 54 that has a construction that can be related to portions of the system 10, such as the downhole sand control screen 24. For instance, the dimensions, shapes, and/or material construction of the filament layer 54 may be designed to mimic the downhole sand control screen 24 based on modeling, experimentation, or a combination thereof. In particular, filaments 56 of the filament layer are constructed in a way that their material loss due to erosion and corrosion can readily be related to the system 10.

By way of non-limiting example, the materials used to construct the sensor element 50 may be the same materials incorporated in the downhole sand control screen 24 or may be materials that are not the same but whose properties can be related to properties of the materials incorporated in the downhole sand control screen 24. One non-limiting example of a relation is a correlation of erosion rates of the sensor element materials and erosion of the materials of the downhole sand control screen 24.

The size of the filament layer 54 or, indeed the entire sensor element 50 may also be related to the downhole sand control screen 24. For example, a certain thickness (e.g., along the flow direction of FIG. 2A and/or in a radial direction relative to a given filament 56) of the filament layer 54 and/or the sensor element 50 may be correlated to a thickness of the downhole sand control screen 24. The shape of the filament layer 54, for example a cross-sectional shape of the filaments 56 (e.g., circular, obround, square, rectangular) may also be related to the downhole sand control screen 24. As noted, any one or a combination of these parameters of the ECD 50 may be designed to facilitate detection of sand and/or determination of erosion and/or corrosion. By way of further example, the sensor element 50 may be designed to have a similar or greater fluid velocity through its one or more filament layers 54 as through the downhole sand control screen 24 to accelerate the manifestation of erosion.

Returning to FIG. 2A, as illustrated the sensor elements 50 are positioned across a flowline 58 such that the sensor elements 50 contact at least a partial stream of fluid flowing through the flowline 58. While traditional sensors may miss portions of the fluid due to solids flowing differently in different flow regimes, in the illustrated embodiment, to ensure accurate detection of erosion and corrosion regardless of the flow regime of the fluid, the sensor element 50 contacts a full stream of fluid flowing through the flowline 58 by being positioned across the entire cross-section of the flowline 58. In addition, certain embodiments of the sensor element 50 do not rely on electronics, and therefore erosion and/or corrosion can be detected even if there is power loss. Further, the sensor element 50 can be designed to not plug up and restrict flow (e.g., by selection of appropriate geometry), and can be bypassed when appropriate as described in further detail below.

In accordance with aspects of this disclosure, the ECD 28 includes means for measuring a change in a physical measurement of the sensor element 50 over a period of time. The physical measurement can be any suitable measurement including but not limited to pressure, flow, weight, mass, volume, average wire thickness, local wire thickness and combinations thereof.

In one embodiment, the physical measurement is weight of the sensor element 50. The change in the physical measurement of the sensor element 50 over the period of time can be monitored to determine whether material loss has occurred in portions of the system. Changes in the physical measurement may also be used to identify whether solids are present in the fluid flowing through the flowline 58. For instance, the absence of a change in the physical measurement can indicate the absence or very low level of erosion and corrosion, and a concomitant absence or very low level concentration of solids in the fluid flowing through the flowline 58. An increase or decrease in a physical measurement can potentially indicate a problematic concentration of solids in the fluid. For instance, if the weight of the sensor element 50 increases, this can indicate plugging (or coating in the case of soft particles) by solid particles. Likewise, if the weight of the sensor element 50 decreases, this can indicate erosion and/or corrosion damage of the sensor element 50 caused by solid particles. In either case, the change in weight observed can be used to activate an alarm to prompt further investigation of the cause of the change and the need for mitigation to assure desired fluid flow, or automatically reroute the flow of fluids through other fluid paths, such as through a slipstream. The rate of change of the physical measurement as in the case of weight can be related to the instantaneous mass concentration of solids. For instance, if a velocity of the fluid flowing through the sensor element 50 is known, the fluid velocity and the loss of material in the sensor element 50 can be used to determine the amount of solids in the fluid.

In one embodiment, the means for measuring the change in the physical measurement of the sensor element 50 over time is by removing the sensor element 50 from the flowline 58 periodically and weighing the sensor element 50, e.g., at the surface. For instance and as discussed in further detail below, the ECD 50 may be mounted on a spool piece, and so can be removed for measurement and inspection. The use of the spool piece also allows capture, removal and analysis of the produced formation solids.

In some embodiments, the means for measuring the change in the physical measurement of the sensor element 50 over time is by vibrating the sensor element 50 in place in the flowline 58. This can advantageously be applied subsea. The sensor element 50 can be vibrated in place and the required force to move the mass of the sensor element 50 can be measured. This vibratory motion can be effected using magnetic or electromagnetic forces, analogous to a solenoid. Alternatively the motion can be induced by flow through the sensor element 50, with vortex shedding around the wires of the screen and detected by transducers such as a piezoelectric crystal.

In still other embodiments, the means for measuring the change in the physical measurement of the sensor element 50 over time is by measurements of acoustic waves transmitted through the filaments 56 of the sensor element 50. High frequency acoustic signals, for instance, may be transmitted through the filaments 56, and the effect of the filaments 56 on the transmitted high frequency acoustic signals may be monitored and correlated to a measure of changes in a dimensional characteristic of the sensing element 50.

In one embodiment, the sensor element 50 is made of a ferromagnetic material such as steel, and mounted in contact with stress sensors. The sensor element 50 is surrounded by an electromagnetic coil through which current is passed. The stress sensors then measure the forces which can be related to the erosion changes in the sensor element 50. In another embodiment, the ferromagnetic screen is vibrated using an electromagnetic coil to enable determination of the resonant higher order harmonics of the sensor element 50 using piezoelectric, capacitance sensors, or accelerometers. These measurements can be used to determine the erosion effects. In another embodiment, a non-ferromagnetic screen has ferromagnetic mass tightly attached to the center of the sensor element 50 and this mass is then used to oscillate the entire screen. In another embodiment, a non-ferromagnetic screen is oscillated using acoustic, ultrasonic, or piezoelectric drivers.

Referring again to FIG. 2A, the illustrated embodiment uses sensors 60 (e.g., a first sensor 60A, a second sensor 60B, and a third sensor 60C) for measuring a change in pressure drop across the first sensor element 50A and the second sensor element 50B positioned across the flowline 58 over a period of time. In the illustrated embodiment, the sensors 60 are used as the means for measuring the physical change in the sensor elements 50 over time. The change in pressure drop across each of the sensor elements 50 over the period of time can be monitored to determine whether erosion and/or corrosion are present in the system 10, and in certain embodiments to determine whether solids are present in the fluid flowing through the flowline 58. While one sensor element 50 may be used in certain embodiments of the ECD 28, the inclusion of two sensor elements 50 may allow the ECD 28 to determine whether material loss is from erosion, corrosion, or a mixture of both, as noted above. As an alternative arrangement, the ECD 50 may include pressure taps upstream and downstream of the sensor elements 50, which are fluidly coupled to one or more differential pressure sensors.

As an example of how such pressure measurements may be related to downhole conditions, a decreasing pressure drop given otherwise constant flowing conditions indicates an increase in the open area of the respective sensor element 50 possibly signifying erosion by solid particles over time. A zero or negligible pressure drop across the sensor element 50 indicates unrestricted fluid and solids flow, and should serve as a warning that downhole sand control or upstream filtration equipment may be at risk of failure. For example, depending on the mesh and flow rate, the pressure drop across the clean sensor element 50 can be on the order of 0.5 psi. An increase in the measured pressure drop at a given rate and flow may indicate solids accumulating on the surface of the sensor element 50, and that solids are being produced that may affect downstream equipment. Examples of control strategies are described in further detail herein with respect to FIG. 6.

A control system 62 may be associated with the ECD 28 to implement certain control strategies and, in certain embodiments, to allow for techniques such as modeling. In the embodiment shown, the control system 62 includes a processor 64 and a memory 66, and is communicatively coupled to the sensors 60. In other embodiments, the control system 62 may be communicatively coupled to other devices that are used for directly or indirectly monitoring changes in the sensor element 50.

As discussed in further detail below, the control system 62 may be communicatively coupled to one or more flow control devices of the system 10 of FIG. 1, such as one or more valve systems 68 as shown in FIG. 2A. In one example embodiment, the control system 62 may be communicatively coupled to the production choke 36 of FIG. 1 to allow for adjustment of the flow of production fluids from the well based at least in part on measurements relating to the sensor element 50. Additionally or alternatively, the control system 62 may utilize one or more user interface devices 69 to alert a user to certain erosion and/or corrosion conditions, and to allow for user inputs and monitoring.

While shown as a single block in FIG. 2A, in an actual implementation the control system 62 may include one or more control devices, which may be the same or different. For example, the control system 62 may include one or more programmable logic controllers, distributed control system devices, computing devices, and so forth. Thus, the processor 64 and memory 66 are described herein to generally denote processing devices and memory devices that may be single units or distributed amongst a variety of devices.

The processor 64 can be any of a variety of types of programmable circuits capable of executing computer-readable instructions to perform various tasks, such as modeling, calculation, and communication tasks. The memory 66 can include any of a variety of memory devices, such as devices using various types of computer-readable or computer storage media. A computer storage medium or computer-readable medium may be any medium that can contain or store the program for use by or in connection with the instruction execution system, apparatus, or device. In example embodiments, the computer storage medium is embodied as a computer storage device, such as a memory or mass storage device. In particular embodiments, the computer-readable media and computer storage media of the present disclosure include at least some tangible devices, and in specific embodiments such computer-readable media and computer storage media include exclusively non-transitory media. Again, generally, the processor 64 and memory 66 allow the control system 62 to perform various monitoring and control tasks relating to the ECD 28 and the flow of production fluids through the system 10.

Figure 3:
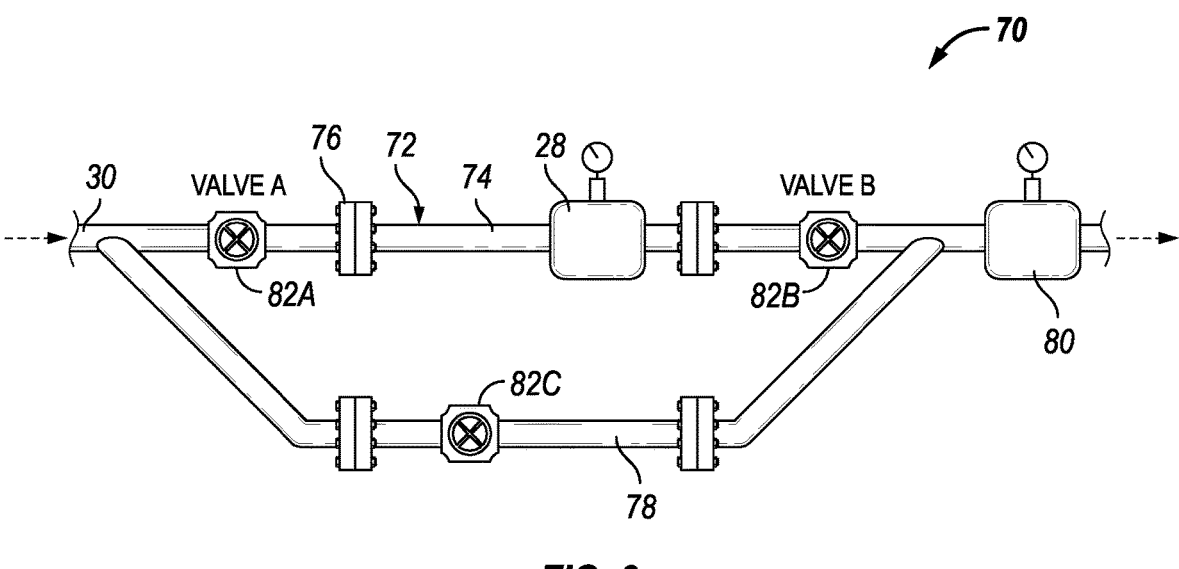
FIG. 3 is a schematic diagram of an embodiment of a slipstream or bypass manifold arrangement in which fluids may be routed around the ECD.

To allow for continued fluid flow while performing measurements, servicing, and so forth, on the ECD 28, in certain embodiments the ECD 28 may be used in conjunction with a manifold arrangement 70 as shown in FIG. 3. The ECD 28 may be mounted onto a spool piece 72 having tubing 74 and flanges 76 allowing for ready removal from the production line 30, disassembly and solids sample collection. In an example operation, a bypass pipe 78 can be used to allow fluid flow to bypass the sensor element 50 in the flowline 58 while the sensor element 50 is removed and being weighed. A flowmeter or other sensor 80 may be positioned downstream of the bypass pipe 78 to monitor flow through the production line 30.

In the illustrated embodiment, the arrangement 70 includes a system of valves 82 (including a first valve 82A, second valve 82B, and third valve 82C) that allow for the spool piece 72 to be isolated while allowing fluids to flow through the bypass pipe 78. The valve states may be controlled based on the desired manner of operation, as shown in Table 1.

TABLE 1

| valve states according to operation | | |
| --- | --- | --- |
| Valve | Normal | Bypass |
| Valve A | Open | Closed |
| Valve B | Open | Closed |
| Valve C | Closed | Open |

Figure 4:
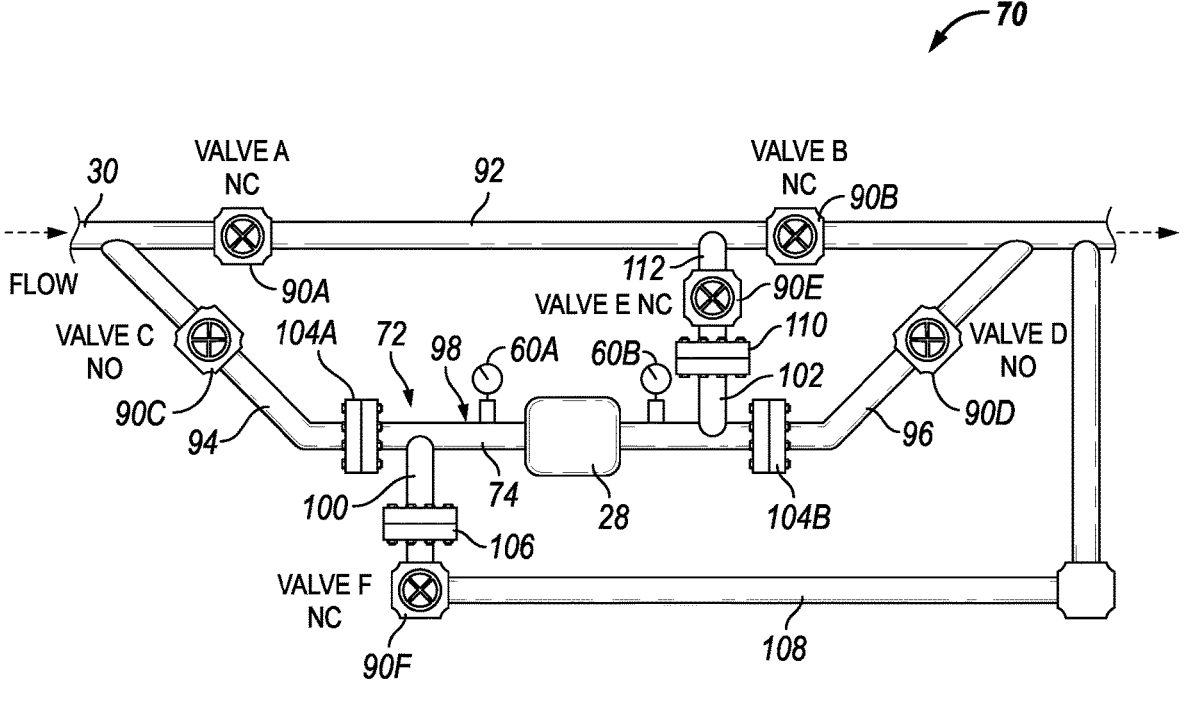
FIG. 4 is a schematic diagram of an embodiment of a slipstream with back-flush manifold arrangement in which fluids may be routed around the ECD or in which fluids may be used to backflush the ECD.

Certain embodiments of this disclosure may allow for bypass and/or backflushing, as depicted by the embodiment of the manifold arrangement 70 illustrated in FIG. 4. The sensor element 50 is placed in the manifold arrangement 70 such that fluid flow can be redirected to flow in the reverse direction across the sensor element 50 and thereby remove any solids from the screen surfaces.

The illustrated embodiment of the arrangement 70 includes a valve system 90 that allows bypass flow through a first flow line 92 and flow through the ECD 28 via a second flow line 94. In the illustrated embodiment, the second flow line 94 is divergent from the first flow line 92 but in other embodiments the flow line associated with flow through the ECD 28 may be a straight line flow relative to flowline 30, with the bypass flow being divergent from the ECD flow (e.g., as shown in FIG. 3). A third flow line 96 (e.g., a convergent flow line) allows flow through the ECD 28 to continue along the main production fluid flowline 30.

The embodiment of the spool piece 72 shown in FIG. 4 includes the tubing 74 including a main flow portion 98, an upstream divergent tube 100 and a downstream divergent tube 102 (upstream and downstream with respect to normal operation and flow through the ECD 28). The main flow portion 98 has flanged connections 104 to the first flow line 94 and the third flow line 96 to allow for normal operation and flow through the ECD 28.

To allow for backflushing of the ECD 28 (and in particular the sensor element 50), the upstream divergent tube 100 has a flanged connection 106 to a flush line 108 that is fluidly connected to the main production fluid flowline 30, and the downstream divergent tube 102 has a flanged connection 110 to a fourth flow line 112 that is divergent from the first flow line 92. Normal flow, backflushing, and bypass flow are accomplished using the connections and valve system 90 as shown in Table 2, which lists the valve states associated with the various flow operations.

TABLE 2

| valve states according to operation | | | |
| --- | --- | --- | --- |
| Valve | Normal | Backflush | Slipstream Bypass |
| Valve A | Closed | Open | Open |
| Valve B | Closed | Closed | Open |
| Valve C | Open | Closed | Closed |
| Valve D | Open | Closed | Closed |
| Valve E | Closed | Open | Closed |
| Valve F | Closed | Open | Closed |

As may be appreciated with reference to Table 2 and FIG. 4, during normal operation, fluid flows through the second flow line 94, through the ECD 28 and the third flow line 96, and out of the manifold arrangement 70. During a backflushing operation, fluid flows through first flow line 92, through the fourth flow line 112, and through the ECD 28 before reaching the flush line 108.

Figure 5:
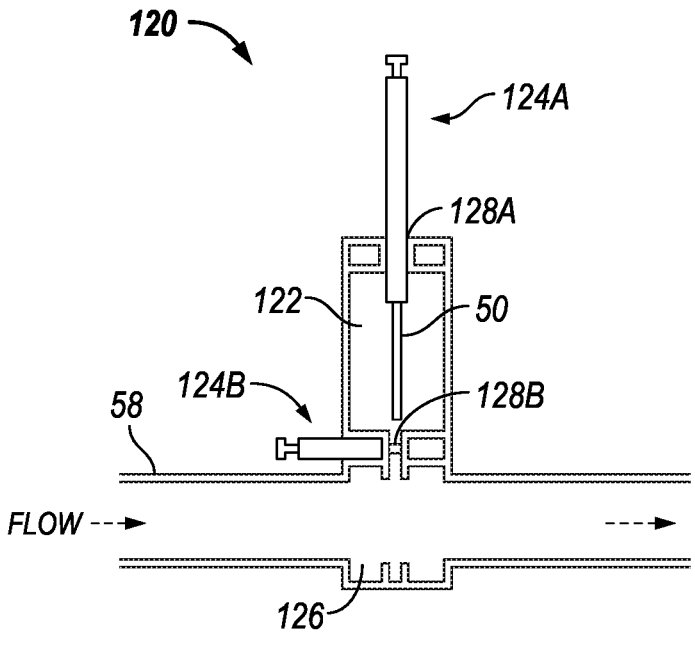
FIG. 5 is a cutaway view of an embodiment of a senior/junior chamber arrangement in which a sensor element of the ECD is able to be removed and inspected without interrupting fluid flow.

In one embodiment shown in FIG. 5, a senior/junior chamber arrangement 120 may be used to allow the sensor element 50 to be removed and inspected without interrupting fluid flow. The illustrated arrangement 120 includes a senior chamber 122 housing actuators 124 that function to allow the sensor element 50 to be placed into the flow of fluid. In particular, the actuators 124 include a first actuator 124A coupled to the sensor element 50 and a second actuator 124B configured to isolate the senior chamber 122 and a junior chamber 126 that is fluidly coupled to the flowline 58. The actuators 124 may be mechanical or motorized, and may be communicatively coupled to a control system to allow for automation of certain operations, as described herein. The actuators 124 are each associated with a respective pressure seal 128—the first actuator 124A with a first pressure seal 128A between the senior chamber 122 and the actuator 124A, and the second actuator 124B with a second pressure seal 128B between the senior chamber 122 and the junior chamber 126.

In the illustrated configuration, the sensor element 50 is not in fluid communication with the flow of fluids. To place the sensor element 50 into the flow, the second actuator 124B (e.g., an isolation actuator) opens the second pressure seal 128B, and the first actuator 128A moves the sensor element 50 into the junior chamber 126. The state of the actuators 124 (e.g., fully energized, partially energized, de-energized) may be controlled by the control system 62

(FIG. 2A) based on a variety of factors, including but not limited to measurements pertaining to the state of the ECD 28.

Indeed, as set forth above, the control system 62 may perform certain monitoring and flow control tasks relating to the ECD 28 and production fluid flow through the system 10. For instance, the control system 62 may use the change in the physical measurement of the sensor element 50 and/or the change in the pressure drop across the sensor element 50 to control the production choke 36. The control system 62 may receive the change in the physical measurement of the sensor element 50 and/or the change in the pressure drop across the sensor element 50 as input into a control strategy for controlling the production choke 36.

Figure 6:
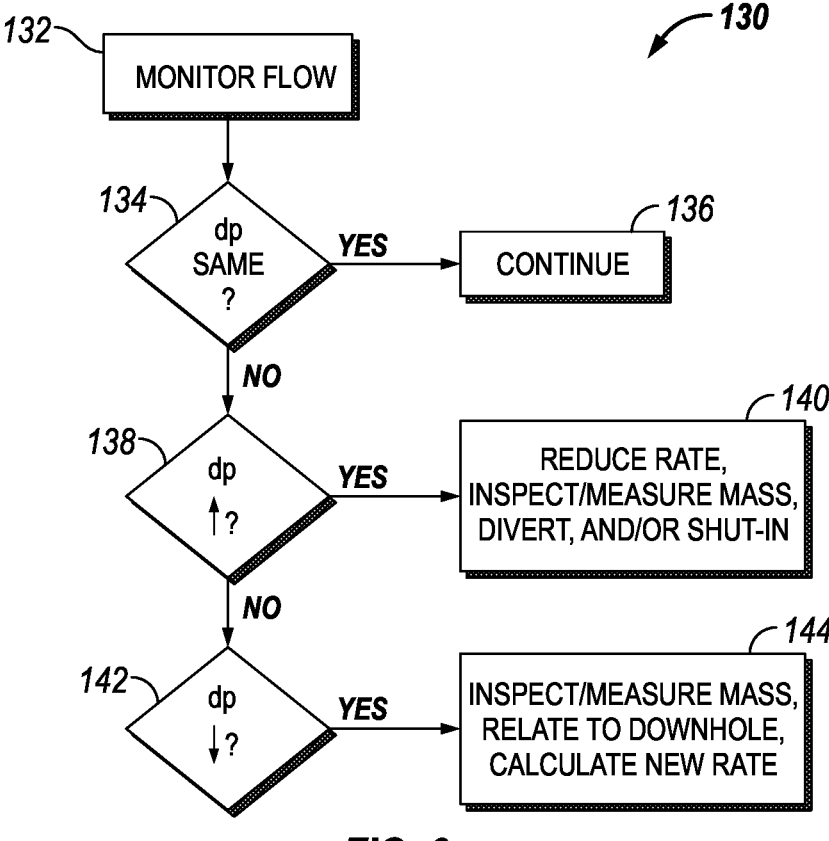
FIG. 6 is a process flow diagram of an embodiment of a method of operating the system of FIG. 1 using input from the ECD.

An example control strategy 130 is shown in FIG. 6 as a process flow diagram performed by the control system 62. As illustrated, the control strategy 130 includes monitoring (block 132) fluid flow through the ECD 28. Such monitoring, in the embodiment of FIG. 6, involves monitoring a change in pressure difference (a change in dp) across the ECD 28.

At query 134, the control strategy 130 includes determining whether the dp is the same. If the dp is the same, the process of monitoring the flow continues (block 136) with substantially no changes to fluid flow based on the ECD 28. However, if the dp has changed, the control strategy 130 includes queries to identify the nature of the change in dp and processes to perform appropriate adjustments. Although shown in a particular order, the queries described herein may be performed in other orders where appropriate.

In particular, the control strategy 130 includes determining whether dp has gone up at query 138. If the dp has gone up (which could potentially indicate plugging due to solids production), the control strategy 130 may involve a variety of processes (block 140) including but not necessarily limited to any one or a combination of reducing flow rate (e.g., via production choke 36), inspecting/measuring the mass of the sensor element 50, diverting flow (e.g., using the arrangements of FIG. 4 or 5), or shutting in of the well.

The control strategy 130 may also involve determining whether the dp has gone down at query 142. If the dp has gone down, various processes (block 144) may be performed. Such processes may include, but are not limited to inspecting/measuring the mass of the sensor element 50 (or multiple sensor elements 50, where appropriate), relating such measurements to the downhole sand control screen 24 (or other components of the system 10), and determining (e.g., calculating) a new production fluid flow rate based on such measurements. As one example, a reduction in dp (e.g., beyond a threshold amount) may indicate erosion, corrosion, or both, of the sensor element 50—thereby indicating erosion of the downhole sand control screen 24 and/or serving as an early indication of increased sand production.

Other control strategies may be additionally or alternatively employed, as noted. In one embodiment, the control strategy can include increasing flow through the production choke 36 in response to the control system 62 receiving a change in the physical measurement that is below a threshold level of change. In one embodiment, the control strategy can include generating an alarm either automatically or by prompting personnel to divert flow from the flowline 58 at the location of the ECD 28, remove and inspect the sensor element 50 for evidence of the presence of solids in response to the control system 62 receiving data that the physical measurement, e.g., weight, of the sensor element 50 is increasing. In one embodiment, the control strategy can include generating an alarm prompting personnel to divert flow from the flowline 58 at the location of the ECD 28, remove and inspect the sensor element 50 for evidence of erosion of the sensor element 50 by solids in response to the control system 62 receiving data that the physical measurement, e.g., weight, of the sensor element 50 is decreasing.

In one embodiment, the control strategy can include increasing flow through the production choke 36 in response to the control system 62 receiving a change in the pressure drop that is below a threshold level of change. In one embodiment, the control strategy can include generating an alarm prompting personnel to divert flow from the flowline 58 at the location of the ECD 28 and remove and inspect the sensor element 50 for evidence of the presence of solids in response to the control system 10 receiving data that the pressure drop is increasing. In one embodiment, the control strategy can include generating an alarm prompting personnel to divert flow from the flowline 58 at the location of the ECD 28 and remove and inspect the sensor element 50 for evidence of erosion of the sensor element 50 by solids in response to the control system 10 receiving data that the pressure drop is decreasing. Other configurations of the control strategy can be employed. In other words, the change in the physical measurement of the ECD 28 and/or the change in the pressure drop across the ECD 28 data can be used as part of a control strategy decision tree. When no evidence is found of solids being produced the control system 62 can be configured to maximize production flow rate.

EXAMPLES

As noted above, the ECD 28 of the present disclosure is configured to detect the onset of erosion and/or corrosion at a much higher level of sensitivity when compared to traditional methods of such detection. To demonstrate this sensitivity, the ECD 28 of the present disclosure was physically tested and compared to conventional "sand" detection systems, including intrusive erosion probes, copper coupons, non-intrusive acoustic sand detectors and also ultrasonic wall thickness measurements.

Figure 7:
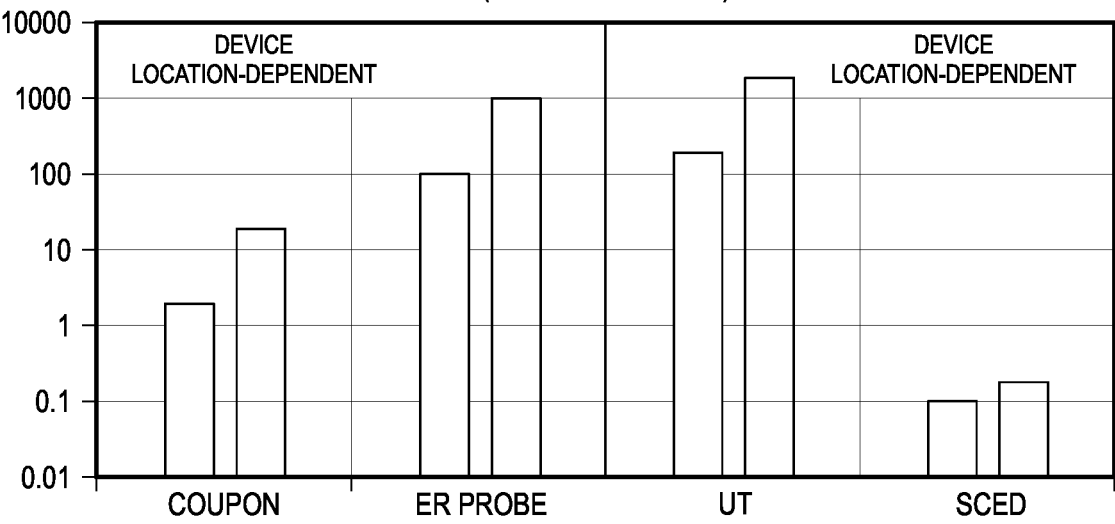
FIG. 7 is a chart illustrating a minimum amount of sand that can be identified using different methods within the same system.

FIG. 7 is a chart illustrating differences between the minimum detectable sand amount using different methods within the same system for both gas-rich and liquid-rich fluid flows containing sand. The minimum detectable sand amount was obtained based on measured erosion/corrosion and thus, lower amounts demonstrate enhanced sensitivity. In particular, the chart of FIG. 7 includes results obtained using methods where sand detection generally is dependent on the location of the device (or multiple devices), for example upstream and downstream of an elbow of a flowline. Such methods include an erosion coupon ("Coupon" in the figure) and an erosion probe ("ER probe" in the figure).

The chart of FIG. 7 also includes results obtained using methods where sand detection is generally independent of the location of the device. These methods include an ultrasonic wall thickness measurement ("UT" in the figure) and the ECD 28 ("SCED" in the figure) of this disclosure. As can be appreciated with reference to the chart, the ECD 28 has a much greater sensitivity to sand, as demonstrated by a much lower minimum detectable sand amount when compared to the other methods. This is demonstrated for both gas-rich and liquid-rich flows.

It should be noted that only the components relevant to the disclosure are shown in the figures, and that many other components normally part of a sand screen assembly or a production system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A method for detecting erosion and corrosion in a production facility for producing oil, gas, or both, the method comprising:

positioning an erosion corrosion detector (ECD) in fluid communication with a pipe in the production facility such that a sensor element of the ECD is positioned across an entire cross-section of the pipe to contact a full stream of fluid flowing through the pipe;

measuring a pressure drop across the sensor element over a period of time;

monitoring the pressure drop across the sensor element over the period of time to determine whether erosion and corrosion has occurred in portions of the production facility due to solids present in the fluid flowing through the pipe.

2. The method of claim 1, wherein the means for measuring the pressure drop across the sensor element over the period of time comprises a pressure transducer.

3. The method of claim 1, further comprising, when the pressure drop is increasing over the period of time, diverting flow from the pipe at the location of the ECD; removing the ECD or the sensor element; and inspecting the ECD or the sensor element for a presence of solids.

4. The method of claim 1, further comprising, when the pressure drop is decreasing over the period of time, diverting flow from the pipe at the location of the ECD, removing the ECD or the sensor element, and inspecting the sensor element for erosion, corrosion, or both.

5. The method of claim 1, further comprising:

receiving the change in the pressure drop across the sensor element over the period of time as input into a control system for controlling a well control valve that controls a rate of production of well fluids; and controlling the well control valve via the control system based at least in part on the change in the pressure drop across the sensor element over the period of time.

6. The method of claim 5 further comprising controlling the well control valve via the control system to increase flow through the well control valve in response to the received change in the pressure drop being below a threshold level of change in pressure drop.

7. An erosion corrosion detector (ECD) comprising:

a spool piece housing at least one sensor element and configured to place the ECD in fluid communication with a flowline of a production facility for producing oil, gas, or both, such that the at least one sensor element is positioned across an entire cross-section of the flowline to contact a full stream of fluid flowing through the flowline;

the at least one sensor element of the ECD comprising a filament layer having a material construction selected to undergo material loss resulting from contact with solids present within the fluid flowing through the flowline in a manner that can be related to erosion, corrosion, or both of one or more elements of the production facility; and means for measuring a change in pressure drop across the at least one sensor element of the ECD over a period of time, the measured change in pressure drop being indicative of an erosion condition, a corrosion condition, or both at the one or more elements of the production facility.

8. The ECD of claim 7, wherein the at least one sensor element comprises a first sensor element and a second sensor element positioned fluidly in series with the first sensor element, the first sensor element and the second sensor element having different susceptibilities to corrosion and each being positioned across an entire cross-section of the flowline to contact the full stream of fluid flowing through the flowline.

9. A system for detecting erosion and corrosion in a production facility for producing oil, gas, or both, comprising:

a sensor element positioned across an entire cross-section of a pipe in the production facility such that the sensor element contacts a full stream of fluid flowing through the pipe; and a means for measuring a change in pressure drop across the sensor element over a period of time;

wherein the change in pressure drop across the sensor element over the period of time can be monitored to identify loss of materials in the system due to erosion, corrosion, or a combination thereof.

10. The system of claim 9, further comprising a bypass pipe to allow fluid flow to bypass the sensor element in the pipe and allow collection and examination of produced solids.

11. The system of claim 9, further comprising:

a junior chamber fluidly coupled to the pipe, and a senior chamber housing actuators that function to allow the sensor element to be placed into the fluid flowing through the pipe, wherein the actuators comprise a first actuator coupled to the sensor element and a second actuator configured to isolate the senior chamber from the junior chamber, wherein the sensor element is configured to be placed in the senior chamber and mechanically lowered into the junior chamber situated across the fluid flow stream, and wherein the sensor element is capable of being removed from the junior chamber into the senior chamber, and isolated for inspection.

12. The system of claim 9, further comprising a manifold arrangement in which the sensor element is placed in the manifold arrangement such that the flow can be redirected to flow in a reverse direction across the sensor element and thereby remove any solids from the sensor element.

13. The system of claim 9, wherein the production facility comprises an offshore production facility and the pipe is subsea.

14. The system of claim 9, further comprising a well control valve; wherein the change in pressure drop across the sensor element over the period of time is utilized to control a rate of flow of well fluids.

15. The system of claim 9, wherein the means for measuring the change in pressure drop across the sensor element over the period of time comprises a pressure transducer.

16. The system of claim 9, further comprising:

a control system for controlling a well control valve to control a rate of production of well fluids, wherein the control system receives the change in pressure drop across the sensor element over the period of time as input for controlling the well control valve.

\* \* \* \* \*